United States Patent
Regada Alvarez et al.

(10) Patent No.: US 10,938,473 B1
(45) Date of Patent: Mar. 2, 2021

(54) HIGH RATE PAYLOAD MANAGEMENT BETWEEN THE GROUND SEGMENT AND A SATELLITE

(71) Applicant: THALES, Courbevoie (FR)

(72) Inventors: Raul Regada Alvarez, Madrid (ES); Sébastien Clausse, Madrid (ES); Josep Prat, Madrid (ES); Adolfo Del Barrio Salas, Madrid (ES); Ricardo Moreno Ruano, Madrid (ES)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 17/039,686

(22) Filed: Sep. 30, 2020

(30) Foreign Application Priority Data

Oct. 17, 2019 (EP) ...................................... 19290103

(51) Int. Cl.
 *H04B 7/185* (2006.01)
(52) U.S. Cl.
 CPC ................ *H04B 7/18513* (2013.01)
(58) Field of Classification Search
 CPC ............................................. H04B 7/185–195
 See application file for complete search history.

(56) References Cited

U.S. PATENT DOCUMENTS

| 2001/0017849 A1* | 8/2001 | Campanella ....... H04B 7/18526 370/326 |
| 2016/0087711 A1* | 3/2016 | Tayrac .............. H04W 72/0473 370/316 |

FOREIGN PATENT DOCUMENTS

| CA | 2 862 019 A1 | 9/2013 |
| WO | 2004/107185 A1 | 12/2004 |

OTHER PUBLICATIONS

Prasad, et al., "Telemetry, Tracking and Command Systems of Spacecraft", IETE Technical Review, 20:6, pp. 561-576, 2003.

* cited by examiner

*Primary Examiner* — Raymond S Dean
(74) *Attorney, Agent, or Firm* — BakerHostetler

(57) ABSTRACT

A method of performing communication between a satellite and a ground segment, the satellite comprising a platform and a payload, the ground segment includes at least one satellite control center configured to generate or process data associated with the satellite platform, the satellite control center directly communicating with the satellite platform on a dedicated channel, referred to as platform channel, wherein the method comprises a step of directly communicating, between the mission control center and an on board processing unit which is configured to manage at least a part of the payload of the satellite, telecommand or telemetry data of the part of the payload of the satellite, on another dedicated channel, referred to as signalling channel, the signalling channel and the platform channel being distinct.

12 Claims, 5 Drawing Sheets ved Center (a ground segment a platform

HIGH RATE PAYLOAD MANAGEMENT BETWEEN THE GROUND SEGMENT AND A SATELLITE

CROSS-REFERENCE TO RELATED APPLICATIONS

This application claims priority to foreign European patent application No. EP 19290103.1, filed on Oct. 17, 2019, the disclosure of which is incorporated by reference in its entirety.

FIELD OF THE INVENTION

The invention relates to a communication method between a satellite and a ground segment. It pertains to the field of satellite telecommunications, and more particularly to the field of telecommunications payload management.

BACKGROUND

In the space telecom market, the demands of the end users (i.e. the telecommunications operators) are getting more and more complex, in terms of real time in-flight configurability, in-flight upgrading of the mission, and flexibility. For example, one of the requests of the telecommunications operators is to be able to adapt immediately the service to the current markets demands. However, these demands have to be satisfied while meeting the requirements of mass and bulkiness of the on-board payload management equipment.

Up to now, the payload in the telecommunication satellites has been managed through the same channel as the one devoted to the platform management (or spacecraft management), which is also called Telemetry, Tracking and Command (TT&C) channel, as disclosed in documents WO 2004/107185 A1 and CA 2 862 019 A1. The uplink telecommand and the downlink telemetry of the platform, as well of the payload, are managed by the Spacecraft Control Center (also called Platform Control Center). On the uplink, the Spacecraft Control Center formulates platform and payload control programs and instructions, and the corresponding telecommand data are uploaded by the satellite in order to configure the satellite and the payload. On the downlink, the satellite transmits telemetry data to the Spacecraft Control Center, which are used to determine the health and location of the satellite, as well as the status of the payload.

The TT&C channel is very secured, so as to ensure that the satellite is always in contact with ground segment. Thus, the antenna of the satellite which is devoted to the platform management needs to be omnidirectional, and the power which is transmitted on this channel is not optimized for a point-to-point link.

Due to these security requirements, the channel has a very low data rate for configuring the payload, and for retrieving telemetry data from the payload (about a few kbit/sec).

Moreover, when the telecommunication operator requires a new configuration of the payload (for example in order to adapt the service to an evolution of the market demand), it transmits the new configuration to the Spacecraft Control Center which, in turn, communicates with the spacecraft. It may be some time, usually a few days, because of the low data rate, which may be problematic for the telecommunication operator.

Therefore, there is a need to overcome the aforementioned drawbacks. In particular, there is a need to configure the payload of a satellite and to retrieve telemetry data of the payload with a high rate and a low latency.

SUMMARY OF THE INVENTION

It is proposed, according to one aspect of the invention, a method of performing communication between a satellite and a ground segment, the satellite comprising a platform and a payload, the ground segment comprising at least one satellite control center configured to generate or process data associated with the satellite platform, said satellite control center directly communicating with the satellite platform on a dedicated channel, referred to as platform channel, characterized in that the method comprises a step of directly communicating, between the mission control center and an on board processing unit which is configured to manage at least a part of the payload of the satellite, telecommand or telemetry data of the part of the payload of the satellite, on another dedicated channel, referred to as signalling channel, said signalling channel and said platform channel being distinct.

In a preferred embodiment, the payload part receives a plurality of telecommand signals from N Mission Control Centers, wherein N 2, said signalling channel comprising N sub-channels, the same telecommand signal modulating a different carrier for each Mission Control Center on a respective sub-channel, the carriers having distinct and non-overlapping spectral bands, the payload part comprising an RF filter having a predefined bandwidth and an adjustable center frequency, the step of step of directly communicating comprising the sub-steps of:

a1) Adjusting the center frequency of the RF filter on a first carrier among the N carriers;

b1) Filtering the received signal, using the RF filter, and determining if a first condition relating to the received signal power level and/or the signal-to-noise ratio of the received signal is satisfied;

c1) If the first condition is satisfied, demodulating the filtered signal, and determining if a second condition relating to the quality of the demodulation of the received signal is satisfied;

d1) If the second condition is satisfied, commanding the payload part according to the telecommand signal;

e1) If either of the first or second condition is not satisfied, adjusting the center frequency of the filter to another carrier among the N carriers, and repeating sub-steps b1) to d1).

In a preferred embodiment, the method comprises a sub-step of generating an error message by the processing unit and transmitting it to the N Mission Control Centers if the first condition and the second condition are not met for any of the N carriers.

In a preferred embodiment, in sub-step b1), it is determined whether the power level of the received signal and/or the signal-to-noise ratio are greater than a predetermined threshold.

In a preferred embodiment, in sub-step b1), it is determined whether the carrier is centered on the center frequency of the RF filter.

In a preferred embodiment, the processing unit receives a plurality of different payload telecommand signals, respectively transmitted by a plurality of user terminals and retransmitted towards the satellite on the signalling channel by at least one mission control center, said at least one mission control center being associated with at least one user, each telecommand signal modulating a different carrier for each user on the signalling channel, said step of directly communicating comprising the sub-steps of:

a2) demodulating, each signal received, in hardware modules specific to each user terminal, said hardware modules being managed by a common programmable logic device,
b2) Storing demodulated telecommand signals in respective mailboxes within a common memory of the programmable logic device, said memory being accessible by a common microprocessor,
c2) Indicating, by the programmable logic device to the microprocessor, the existence of a message which is specific to one of the user terminals in one of the mailboxes,
d2) reading by the microprocessor the content of each of the mailboxes, and controlling the payload part according to the telecommand signal.

In a preferred embodiment, the method comprises a preliminary sub-step of storing, in a memory which is external to the programmable logic device, called external memory, a security key which is associated to each user, where, in the substeps a2) to d2), the programmable logic device communicates with the external memory, each security key being accessible to only one user, the method further comprising:
  inserting a key in the telecommand signal, called the transmission key,
  comparing the security key with the transmission key, and controlling the payload according to the result of said comparison.

In a preferred embodiment, the step of directly communicating, comprises the sub-steps of:
a3) transmitting, by the Mission Control Center, a telecommand signal on the signaling channel
b3) extracting a time data from the telecommand signal
c3) updating a on board time which is embedded in the payload, based on the time data.

In a preferred embodiment, the sub-step b3) comprises generating, by a first numerically controlled oscillator, a set of symbols including the time data, based on the telecommand signal, the first numerically controlled oscillator being synchronized with a symbol duration determining unit.

In a preferred embodiment, sub-step c3) is implemented by using a second numerically controlled oscillator, which synchronizes the time data with a clock signal generated in the payload.

In a preferred embodiment, the method comprises a sub-step d3) of controlling the payload according to the updated on board time.

In a preferred embodiment, the time data is computed based on a Global Navigation Satellite System.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
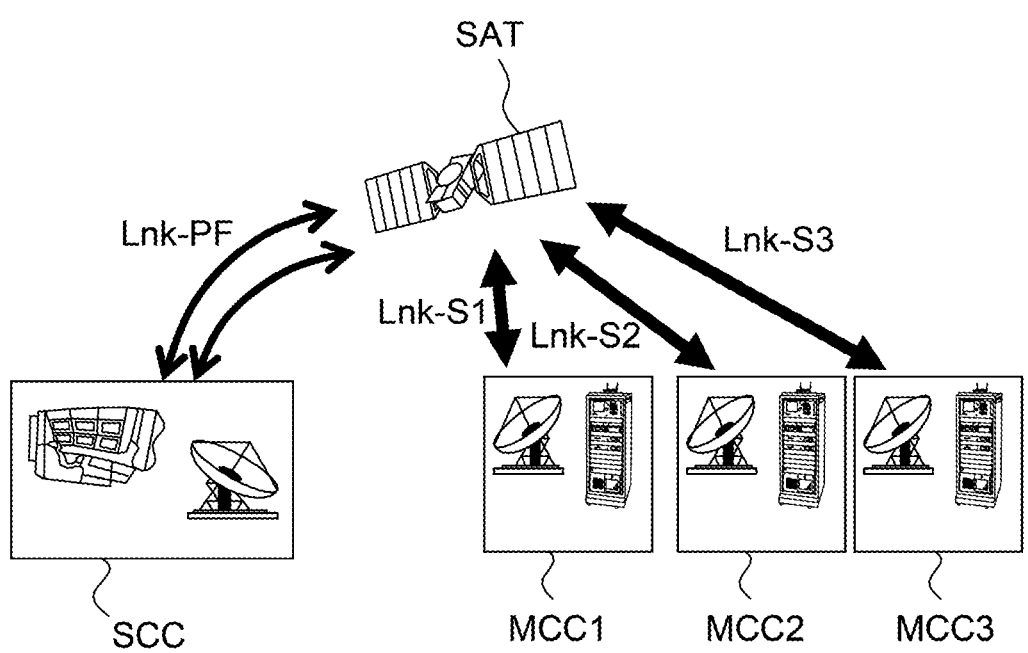
FIG. 1 illustrates the relation between the ground segment and the satellite, including the signalling channel and the platform channel.

In FIG. 1, a satellite control center SCC communicates with the satellite management unit on a platform channel Lnk-PF. The platform channel Lnk-PF is used for the spacecraft configuration and housekeeping. The platform channel Lnk-PF may also be used as a troubleshooting tool for the payload configuration and housekeeping, as it is the case for state of the art communication systems. Data relative to the on-board activities of the satellite's platform are transmitted on the platform channel, for example propulsion, thermal control, power supply, attitude command and control. The communication between the satellite control center SCC and the satellite management unit may comprise for example the transmission of telemetry data (on the downlink) and the transmission of telecommand data (on the uplink). Both the platform and the payload transmit or receive telemetry and telecommand data to/from the ground segment.

The satellite control center SCC communicates with the satellite platform PF, so as to transmit or receive telecommand and/or telemetry data associated to the satellite platform, on a dedicated channel, referred to as platform channel.

A typical telecommunication link between the satellite's platform and the satellite control center SCC is disclosed in the article "*Telemetry, Tracking and Command Systems of Spacecraft*", S N Prasad & S Pal FIETE (2003), IETE Technical Review, 20:6, 561-576.

The mission control center MCC, which is associated to a proper user (also referred to as customer or operator), directly communicates with an on board processing unit PRU which is configured to control and monitor the main elements of the payload (channelizer/payload processor, or other payload units), on another dedicated channel, referred to as signalling channel. What is essential for implementation of the method is that the signalling channel and the platform channel are distinct.

Thanks to the method of performing a communication between the ground segment and the satellite, the communication between the payload and the ground segment does not pass through the satellite control center SCC. Indeed, the communication between the payload and the ground segment takes place on a channel which is dedicated to the payload, referred to as signalling channel. Each operator has its own signalling channel. For example, on FIG. 1, up to three signalling channels (Lnk-S1, Lnk-S2, Lnk-S3) are managed by their respective operators. Each telecommunication operator has its own signalling channel; therefore, each operator can monitor and control the payload, independently from the other operators. The platform channel and the signalling channel are distinct. The ground segment comprises a mission control center, which is also distinct from the satellite control center SCC. The mission control center is operated and managed by the telecom operator.

Thanks to that configuration, the payload can be managed with a high flexibility degree.

Moreover, the security and availability requirements may be lower for the signalling channel than the platform channel; therefore the data rate may be significantly higher than the current rate of payload and telemetry data, when transmitted to or from the satellite control center SCC.

Figure 2:
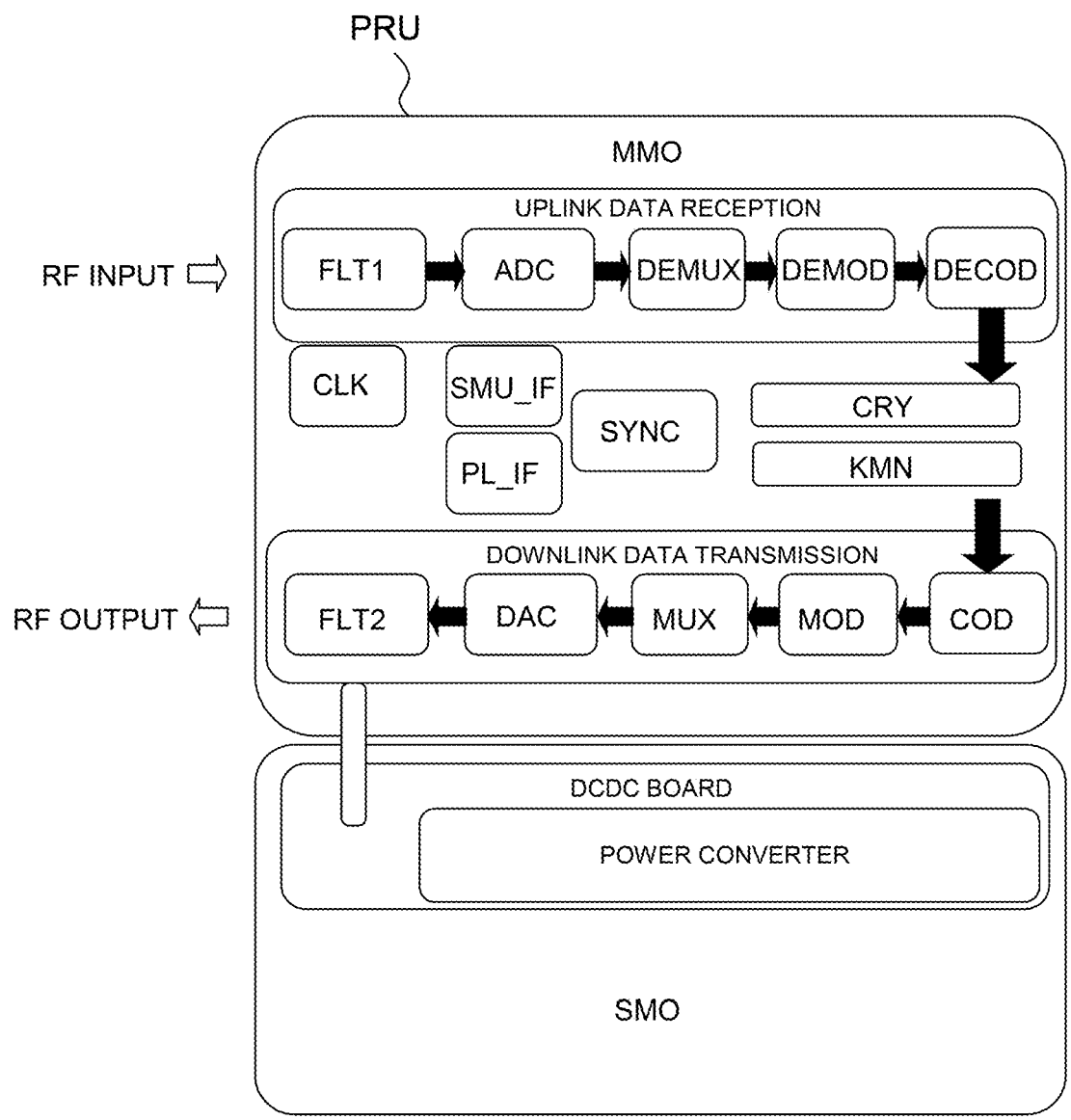
FIG. 2 illustrates a functional diagram of the payload management processing unit, including a main module and a service module.

FIG. 2 illustrates a functional diagram of the payload management processing unit PRU, which is configured to communicate with the mission control center MCC, and also to operate the payload according to the command of the mission control center MCC.

The payload management processing unit PRU includes a main module MMO, which processes and sets up the incoming telemetry and/or telecommand signals, and a service module SMO which comprises a power supply such as a DC/DC board for providing the required power to main module MMO; it may also comprise an expansion board and additional interfaces.

The main module is in charge of the reception of the radiofrequency signal from the ground segment (after previous frequency conversion, if needed) RF_INPUT. The RF filter FLT1 performs the needed filtering prior to digitalizing the information. Digitalization is performed by the sampler ADC. Demultiplexer DEMUX extracts the individual signalling channels which have been filtered and sampled. The demodulator DEMOD outputs binary I (In Phase) and Q (Quadrature) components from the individual signalling channels, by using timing and phase tracking loops. Then, decoder DECOD detects and corrects errors which may arise in the signalling channel.

After decoding, decryption can be implemented. Decryption can be implemented in the uplink using a set of keys securely uploaded and managed in the unit (decryptor/encryptor CRY and key manager KMN). Additionally, decryption can be bypassed or replaced by an external unit with commercial or military cyphering algorithms.

Finally the incoming telecommand signals reach the last processing element where all selected mission functions are implemented. The payload management processing unit PRU also comprises a clock generator CLK. The clock generator CLK, based on an external clock reference, provides clock signals to all the digital components of the payload management processing unit PRU, so that all the gates of the digital components (such as sampler ADC, demultiplexer DEMUX, demodulator DEMOD and decoder DECOD) may be driven synchronously. The payload management processing unit PRU also includes a satellite management unit interface SMU_IF in order to communicate with the platform, a payload interface PL_IF in order to transmit the telecommand signals to the payload, or to receive telemetry signals from the payload, and a synchronisation element SYNC for controlling the fine synchronization between different element of the payload (for example between different sources for beam hopping).

In the same way as telecommands are processed, the payload telemetry data (configuration report, spectrum analysis, events logs) follow the inverse process to allow its transmission to ground. The telemetry data is sent first to the decryptor/encryptor CRY, either internal to the payload management processing unit PRU or external to it, to continue afterwards with the different transmission steps as coding (coder COD), modulation (modulator MOD) and multiplexing (multiplexer MUX) of different user channel to be finally converted to radiofrequency using a direct conversion technique (converter DAC). Finally, after RF filtering (RF filter FLT), the signal is transmitted to the ground segment.

The service module SMO can implement the functions of generating the secondary voltage to be used for the processing board, from the primary voltage of the platform, overvoltage, undervoltage and overcurrent protection, discrete telecommand and telemetry lines for housekeeping and expansion capabilities in term of interfaces and processing capacity.

Redundancy of the payload management processing unit PRU may be implemented. Indeed, the flight segment consists in a totally redounded approach, to maximize reliability acting as payload computer. The unit is connected to the main spacecraft elements, to the on board computer to ensure the coherence in the received commands, as well as to the different elements of the payload for its control, management and monitoring.

Two identical halves operating in cold redundancy are embarked, to ensure reliability; at the same time the switching time between to two halves is minimized so as to ensure a very high availability. Each one of the two halves contains all elements needed to implement the required services and functions.

Figure 3:
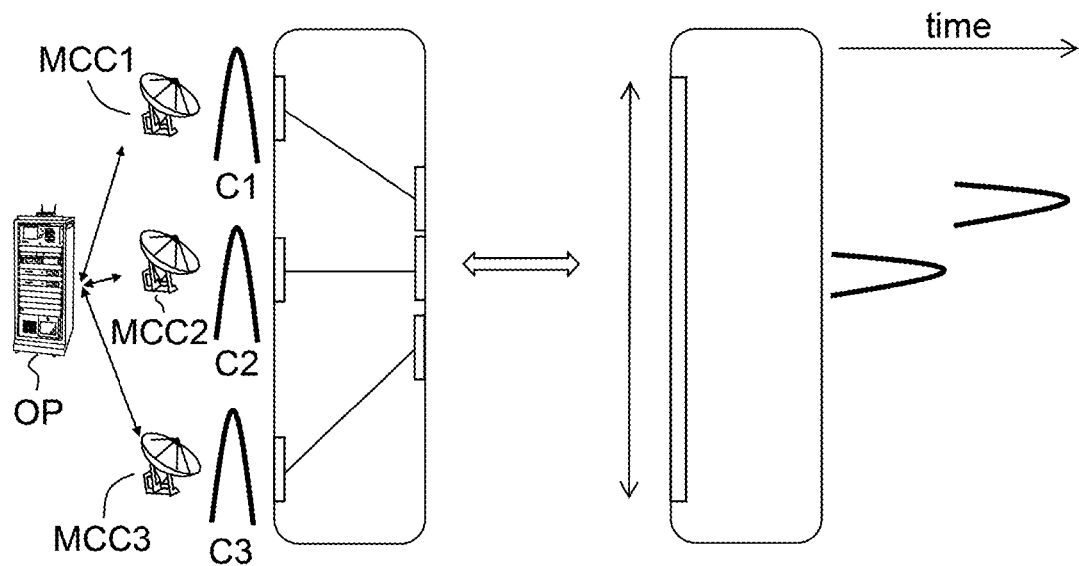
FIG. 3 illustrates a first aspect of the communication method according to the invention, wherein the payload part receives a plurality of telecommand signals from a single user terminal, which are retransmitted to the payload part by N Mission Control Centers.
Figure 4:
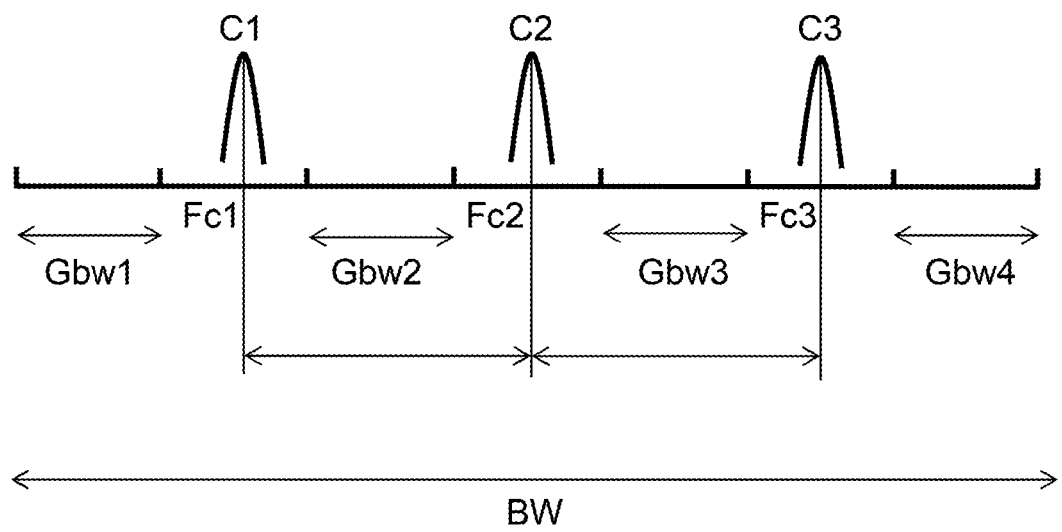
FIG. 4 illustrates a frequency spectrum containing three carriers of telecommand signals transmitted from a single user terminal.

FIGS. 3 and 4 illustrate a first embodiment of the invention. On FIG. 3, an operator OP, for example a telecommunications operator, communicates with at least two Mission Control Centers (three in FIG. 3: MCC1, MCC2 and MCC3). The communication is made by using more than one Mission Control Center, in order to enhance the reliability of the communication. Indeed, each Mission Control Center comprises a satellite gateway, which has its own carrier (C1, C2, C3). The different carriers have distinct and non-overlapping spectral bands.

FIG. 4 illustrates the non-overlapping of the spectral bands of the carriers of the ground stations. The total bandwidth BW (for example 50 MHz) which is allocated to the signalling channel is the result of a trade-off between the ability to manage several carriers with a desired data rate for the telecommand and telemetry link, and the fact that the total bandwidth should be negligible compared to the user bandwidth, i.e. the one that is devoted to the telecommunication signal which is to be transmitted through the satellite.

Each carrier (C1, C2, C3) has a central frequency (Fc1, Fc2, Fc3). The central frequencies are separated by guard elementary bandwidths (Gbw1, Gbw2, Gbw3, Gbw4, for example each of 7 MHz) so as to clearly avoid an overlapping of the sub-channels.

The RF filter FLT1, illustrated in FIG. 2, has a predefined bandwidth and an adjustable center frequency, so as to tune the filter automatically to one of the carriers. To do so, the following steps are implemented:

In a first step a1), The RF filter FLT1 is tuned: the center frequency of the RF filter FLT1 is adjusted on a first carrier among the N carriers. The carrier for which the adjustment is firstly made is called default carrier.

In a second step b1), once the RF filter FLT1 has been adjusted, the received signal is filtered, using the RF filter, and it is determined if a first condition relating to the received signal power level and/or the signal-to-noise ratio of the received signal is satisfied. In a preferred embodiment, it is determined whether the power level of the received signal and/or the signal-to-noise ratio are greater than a predetermined threshold. It may also be determined whether the carrier is centered on the center frequency of the RF filter FLT1. Step b1) is implemented by the demultiplexer DEMUX, which is illustrated on FIG. 2.

According to a third step c1) If the first condition is satisfied, the filtered signal is demodulated by the demodulator DEMOD (see FIG. 2), and it is determined whether a second condition relating to the quality of the demodulation of the received signal is satisfied. For example, the second condition may be determining if a locking of the demodulator to the carrier can be successfully made.

If the first and the second conditions are met, in a fourth step d1) the payload is commanded according to the telecommand signal;

If either of the first or second condition is not satisfied, in a fifth step e1), the center frequency of the RF filter is adjusted to another carrier among the N carriers, and sub-steps a1) to d1) are repeated to the other carrier. Thus, the same process is repeated for all the sub-channels.

If it turns out that no locking can be achieved for one of the N sub-channel, which means that the first and second conditions are not met for any of the sub-channels, a report is provided to the satellite management unit SMU, indicating that no carrier has been correctly detected. Then, the report is transmitted to the N Mission Control Centers MCC.

Therefore, a single user/telecommunication operator can operate with several satellite gateways, by using several Mission Control Centers.

Thanks to this process, undesired signals, for example jamming signals, can be discarded. For example, on the ground segment, a ground station may decide to transmit telecommand signals not on the center frequency of the filter, but with a slight offset, for example 1 kHz above the center frequency of the filter. Then, it can be decided that if the carrier that is being locked is exactly on the center frequency of the elementary bandwidth, the signal is not the expected signal coming from the ground station. Therefore, the signal should be discarded.

This is made possible thanks to the direct link between the payload and the Mission Control Center.

Figure 5:
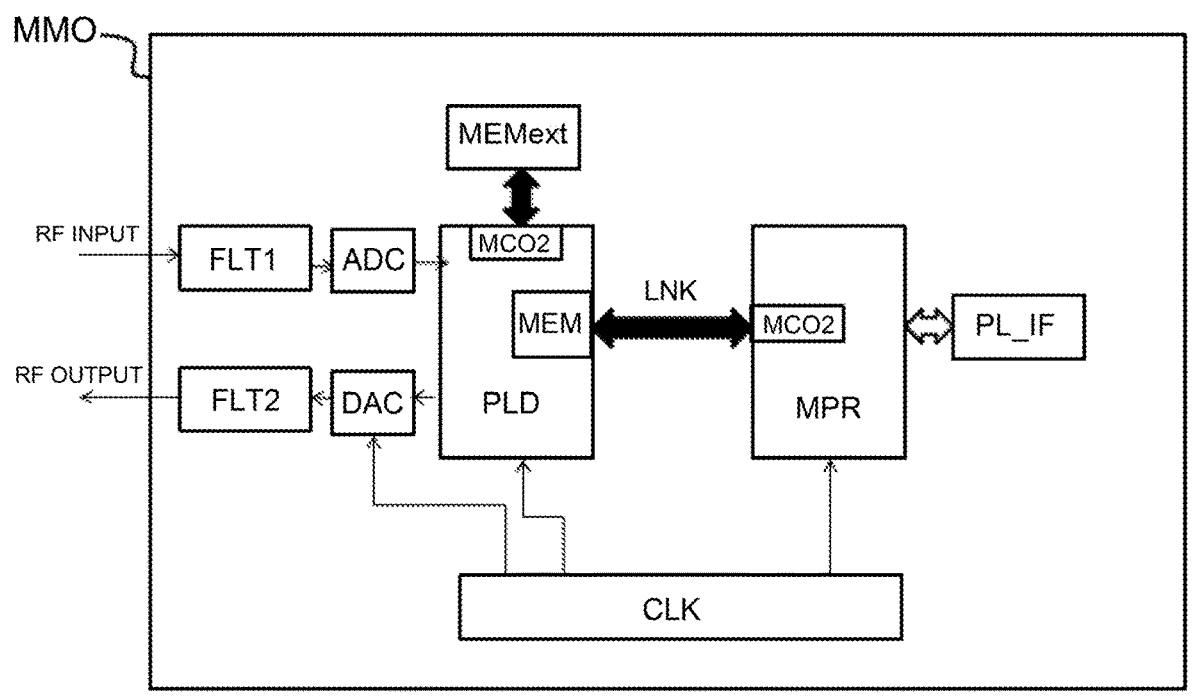
FIG. 5 illustrates a second aspect of the communication method according to the invention, wherein the programmable logic device, which is common for all the users, interacts with the microprocessor for segregating the streams of several users.

According to a second embodiment of the invention, a segregation scheme between different users may be implemented. FIG. 5 illustrates a block diagram of the main module MMO of the payload management processing unit PRU, which is also illustrated by FIG. 2.

The payload management processing unit PRU comprises a common programmable logic device PLD. The common programmable logic device PLD can be, for example an FPGA (Field-Programmable Gate Array), which has the advantage of being reprogrammable, thus the configured design can be modified, even during the flight. The common programmable logic device PLD is coupled directly to the analog to digital converter ADC and to the digital to analog converter DAC. The latter are coupled to the RF filters FLT1, FLT2. The common programmable logic device PLD is also coupled to a clock generator CLK, which acts as an internal clock reference for all the elements of the payload management processing unit PRU.

Thus, the set of digital data including the data of N users (i.e. the telecommand signals of N telecommunication operators; each operator is connected to one Mission Control Center) are filtered and digitalized all together. At this stage the telecommand data are mixed and it is required to ensure the segregation to treat this data in order to split it into N streams, one for each user. The common programmable logic device PLD comprises a plurality of hardware modules such as demultiplexers DEMUX, demodulators DEMOD and decoders DECOD, so that each telecommand signal can be processed independently in a dedicated demultiplexer, demodulator and decoder.

Therefore, in a first sub-step a2), each received signal received is demodulated in a specific hardware module of the programmable logic device PLD.

Then, in a step b2), the demodulated telecommand signals are stored in mailboxes. Each mailbox is associated to a user. The implementation of barriers during the design of the programmable logic device PLD ensures that the data streams coming from different Mission Control Centers are separated. The mailboxes are separated, while being arranged in a common memory MEM of the programmable logic device PLD.

The memory MEM can be accessed by a common microprocessor MPR, through a first memory controller MCO1. The common microprocessor MPR is in charge of interpreting and routing the data to the destination in form of physical element through the correspondent physical interface (payload interface PL_IF).

There is only one physical link LNK between the common programmable logic device PLD and the common microprocessor MPR. Thus, it has to be ensured that the segregated data are sent to the common microprocessor MPR separately.

In a third sub-step c2), the common programmable logic device PLD advises the microprocessor MPR of the existence of a message which is specific to one of the user terminals in one of the mailboxes.

Then, in a fourth sub-step d2), the common microprocessor MPR reads the content of each of the mailboxes, and controls the payload part according to the telecommand signal.

The processor maintains the segregation of the data by means of using a supervisor to split the processing of the data in different execution threads. The supervisor ensures also that no collision in the physical elements of the system (storage in different memory areas, access to the interfaces through their specific drivers) appears. The supervisor is a specific software running on the microprocessor MPR, which generates the N independent threads.

An additional segregation of the streams of the N users can also be considered. An external memory MEMext, which is coupled to the programmable logic device PLD. The external memory MEMext is a non-volatile memory, for example an EEPROM (Electrically-Erasable Programmable Read-Only Memory). It stores N security keys, each security key being associated to one user. The security keys may be preloaded by the user in the external memory MEMext, before the satellite's launch.

Then, in the sub-steps a2) to d2), the programmable logic device PLD communicates with the external memory MEMext through a second memory controller MCO2. A key, called transmission key, is inserted by the Mission Control Center in the telecommand signal. The security key is compared with the transmission key, and if they are identical, the payload is controlled according to the telecommand signal. The keys are managed by the aforementioned decryptor/encryptor CRY and key manager KMN, which are schematically illustrated by FIG. 2.

Therefore, the satellite has a multiuser capability, while segregating the user.

Figure 6:
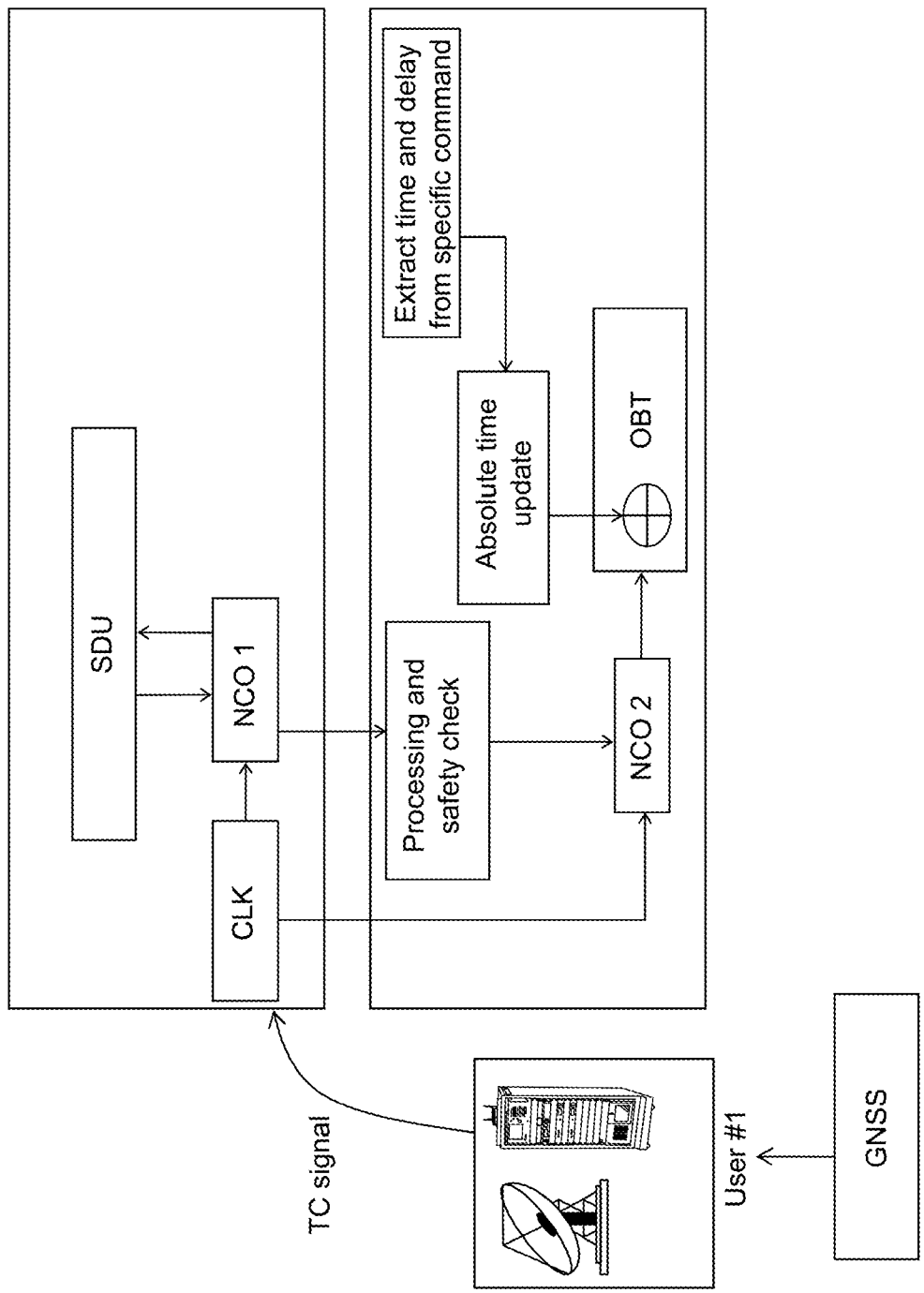
FIG. 6 illustrates a third aspect of the communication method according to the invention, for updating an on board time which is embedded in the payload.

A third embodiment of the invention, illustrated by FIG. 6, enables to deal with enhanced telecommunications services, which require a very precise timing. This embodiment is also made possible by the signalling channel, which has a high data rate compared to state of the art payload telecommand methods.

In the method of performing a communication between a satellite SAT and a ground segment GS, the following sub-steps are implemented:

In a first sub-step a3), the Mission Control Center MCC transmits to the satellite a telecommand signal TC, on the signalling channel. The payload management processing unit PRU receives the telecommand signal.

In a second sub-step b3), the programmable logic device PLD extracts a time data from the telecommand signal. In a preferred embodiment, the time data is computed based on a satellite geolocalisation system, for example based on a Global Navigation Satellite System, such as GPS or Galileo. Therefore, the Mission Control Center MCC has a very precise knowledge of the time data, and transmits it on the signalling channel.

In a third sub-step c3), an on board time OBT, which is embedded in the payload, is updated, based on the time data. Therefore, the on board time of the payload may updated whenever a time data is transmitted by the Mission Control Center MCC.

Therefore, an end-to-end synchronization between the ground segment and the flight segment enables a proper management of the elements leading to fulfill beam hopping requirements. A synchronization delay lower than 1 millisecond is recommended in order to send commands to the drivers of the RF switches and the payload processor, so as to implement the beam forming technique.

In the programmable logic device PLD, a first numerically controlled oscillator NCO1, which is also coupled to the clock generator CLK, controls the symbol time of the incoming telecommand signal, on the signalling channel.

Advantageously, sub-step b3) comprises generating a set of symbols including the time data, based on the telecommand signal. The set of symbols is generated by the first numerically controlled oscillator NCO1, which is synchronized with a symbol duration determining unit SDU. The first numerically controlled oscillator NCO1 and the symbol duration determining unit SDU are located in the programmable logic device PLD.

Advantageously, sub-step c3) is implemented by using a second numerically controlled oscillator NCO2, which synchronizes the time data with a clock signal generated in the payload. The second numerically controlled oscillator NCO2 is also located in the programmable logic device PLD.

Thanks to the third embodiment, the telecommand signal is able to provide data on the next Pulse Per Second PPS and the delay from last PPS to the command frame start. This specific telecommand is interpreted on board to allow the synchronization. A frequency soft steering is performed based on symbol rate of the uplink and in the same way the absolute time soft steering is based on the telecommand data and calibration factors that depend on the satellite delay to be stored and processed by the programmable logic device PLD, and also on the ground delay clock to antenna data to be introduced in the telecommand.

A relative radial speed of the satellite, compared to the Mission Control Center, and/or meteorological conditions such as the rain, may generate a frequency shift on the signalling channel, due to the Doppler effect. In that case, a correction of the on board clock is made, based on the movement of the satellite, and/or based on the determined meteorological conditions.

Advantageously, the method comprises a sub-step d3) of controlling the payload according to the updated on board time OBT. Thanks to the aforementioned fine synchronization mechanism, a very precise control of the payload can be achieved, for example for beam hopping. Indeed, beam hopping requires a tight control of synchronization between commands to the different elements of the payload.

In the same way as telecommand signals are processed for the aforementioned method, the payload telemetry data follow the inverse process.

The invention claimed is:

1. A method of performing communication between a satellite (SAT) and a ground segment (GS), the satellite (SAT) comprising a platform (PF) and a payload (PL), the ground segment comprising at least one satellite control center (SCC) configured to generate or process data associated with the satellite platform, said satellite control center (SCC) directly communicating with the satellite platform (PF) on a dedicated channel, referred to as a platform channel, and comprising also at least one mission control center (MCC) which is distinct from said satellite control center (SCC), wherein the method comprises a step of directly communicating, between the mission control center (MCC) and an on board processing unit (PRU) which is configured to manage at least a part of the payload of the satellite, which is a telecommand or telemetry data part of the payload of the satellite, on another dedicated channel, referred to as signalling channel, said signalling channel and said platform channel being distinct.

2. The method of claim 1, wherein the payload part receives a plurality of telecommand signals from N Mission Control Centers (MCC), wherein N 2, said signalling channel comprising N sub-channels, the same telecommand signal modulating a different carrier for each Mission Control Center (MCC) on a respective sub-channel, the carriers (C1, C2, C3) having distinct and non-overlapping spectral bands, the payload part comprising an RF filter (FLT1) having a predefined bandwidth and an adjustable center frequency, the step of step of directly communicating comprising the sub-steps of:
- a1) adjusting the center frequency of the RF filter (FLT1) on a first carrier among the N carriers;
- b1) filtering the received signal, using the RF filter, and determining if a first condition relating to the received signal power level and/or the signal-to-noise ratio of the received signal is satisfied;
- c1) if the first condition is satisfied, demodulating the filtered signal, and determining if a second condition relating to the quality of the demodulation of the received signal is satisfied;
- d1) if the second condition is satisfied, commanding the payload part according to the telecommand signal;
- e1) if either of the first or second condition is not satisfied, adjusting the center frequency of the filter to another carrier among the N carriers, and repeating sub-steps b1) to d1).

3. The method of claim 2, comprising a sub-step of generating an error message by the processing unit (PRU) and transmitting it to the N Mission Control Centers (MCC) if the first condition and the second condition are not met for any of the N carriers.

4. The method according to claim 2, wherein, in sub-step b1), it is determined whether the power level of the received signal and/or the signal-to-noise ratio are greater than a predetermined threshold.

5. The method according to claim 2, wherein, in sub-step b1), it is determined whether the carrier is centered on the center frequency of the RF filter (FLT1).

6. The method of claim 1, wherein the processing unit (PRU) receives a plurality of different payload telecommand signals, respectively transmitted by a plurality of user terminals and retransmitted towards the satellite on the signalling channel by at least one mission control center (MCC), said at least one mission control center (MCC) being associated with at least one user, each telecommand signal modulating a different carrier for each user on the signalling channel, said step of directly communicating comprising the sub-steps of:

- a2) demodulating, each signal received, in hardware modules specific to each user terminal, said hardware modules being managed by a common programmable logic device (PLD),
- b2) storing demodulated telecommand signals in respective mailboxes within a common memory (MEM) of the programmable logic device (PLD), said memory (MEM) being accessible by a common microprocessor (MPR),
- c2) indicating, by the programmable logic device (PLD) to the microprocessor (MPR), the existence of a message which is specific to one of the user terminals in one of the mailboxes,
- d2) reading by the microprocessor (MPR) the content of each of the mailboxes, and controlling the payload part according to the telecommand signal.

7. The method according to claim 6, comprising a preliminary sub-step of storing, in a memory which is external to the programmable logic device, called external memory (MEMext), a security key which is associated to each user, where, in the substeps a2) to d2), the programmable logic device (PLD) communicates with the external memory (MEMext), each security key being accessible to only one user, the method further comprising:

- inserting a key in the telecommand signal, called the transmission key,
- comparing the security key with the transmission key, and controlling the payload according to the result of said comparison.

8. The method of claim 1, wherein in said step of directly communicating, comprises the sub-steps of:

- a3) transmitting, by the Mission Control Center (MCC), a telecommand signal on the signaling channel
- b3) extracting a time data from the telecommand signal
- c3) updating a on board time (OBT) which is embedded in the payload, based on the time data.

9. The method of claim 8, wherein the sub-step b3) comprises generating, by a first numerically controlled oscillator (NCO1), a set of symbols including the time data, based on the telecommand signal, the first numerically controlled oscillator (NCO1) being synchronized with a symbol duration determining unit (SDU).

10. The method of claim 8, wherein sub-step c3) is implemented by using a second numerically controlled oscillator (NCO2), which synchronizes the time data with a clock signal generated in the payload.

11. The method of claim 8, comprising a sub-step d3) of controlling the payload according to the updated on board time (OBT).

12. The method of claim 8, the time data being computed based on a Global Navigation Satellite System.

* * * * *